US007013027B2

(12) United States Patent
Burgi et al.

(10) Patent No.: US 7,013,027 B2
(45) Date of Patent: *Mar. 14, 2006

(54) METHOD OF DETECTING RELATIVE MOVEMENT BETWEEN A SCENE FROM WHICH RADIATION EMANATES AND A MATRIX OF PIXELS ABLE TO MEASURE THE RADIATION

(75) Inventors: Pierre-Yves Burgi, Geneva (CH); Eric Grenet, Neuchatel (CH); Pierre-Francois Ruedi, Hauterive (CH)

(73) Assignee: CSEM Centre Suisse d'Electronique et de Microtechnique S.A., Neuchatel (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 706 days.

(21) Appl. No.: 10/231,825

(22) Filed: Aug. 30, 2002

(65) Prior Publication Data

US 2003/0044049 A1    Mar. 6, 2003

(30) Foreign Application Priority Data

Aug. 31, 2001  (EP) .................................. 01402269

(51) Int. Cl.
*G06K 9/00*  (2006.01)
(52) U.S. Cl. ..................................................... 382/107
(58) Field of Classification Search ........ 382/103–107; 73/488; 348/154, 155; 356/27, 28; 235/454
See application file for complete search history.

(56) References Cited

U.S. PATENT DOCUMENTS 5,233,417 A * 8/1993 Nouso .................... 348/207.99
5,701,163 A * 12/1997 Richards et al. ............ 348/578
2002/0071595 A1* 6/2002 Pirim .......................... 382/107

FOREIGN PATENT DOCUMENTS

WO      WO9909736       2/1999

OTHER PUBLICATIONS

A New Structure of the 2-D Silicon Retina by Chung-Yu Wu, Member, IEEE and Chin-Fong Chiu, Member, IEEE IEEE Journal of Solid-State Circuits—vol. 30, n 8, Aug. 1, 1995.

* cited by examiner

*Primary Examiner*—Jingge Wu
*Assistant Examiner*—Craig Kronenthal
(74) *Attorney, Agent, or Firm*—Jacobson Holman PLLC

(57) ABSTRACT

A method of detecting relative movement between a scene from which radiation emanates and a matrix of pixels observing the scene and capable of detecting the radiation, each pixel of the matrix measuring contrast vector information representative of the observed scene monitors the evolution of the contrast vector information in each pixel of the matrix During a first time interval, it detects among the pixels the pixel whose magnitude vector information value is greater than the magnitude vector information value of the adjacent pixels. During a second time interval consecutive to the first time interval it detects if the magnitude vector information of the pixel whose value was at a maximum during the first time interval has decreased. It generates output signals representative of the relative movement if a decrease is detected.

9 Claims, 7 Drawing Sheets

FIG. 1

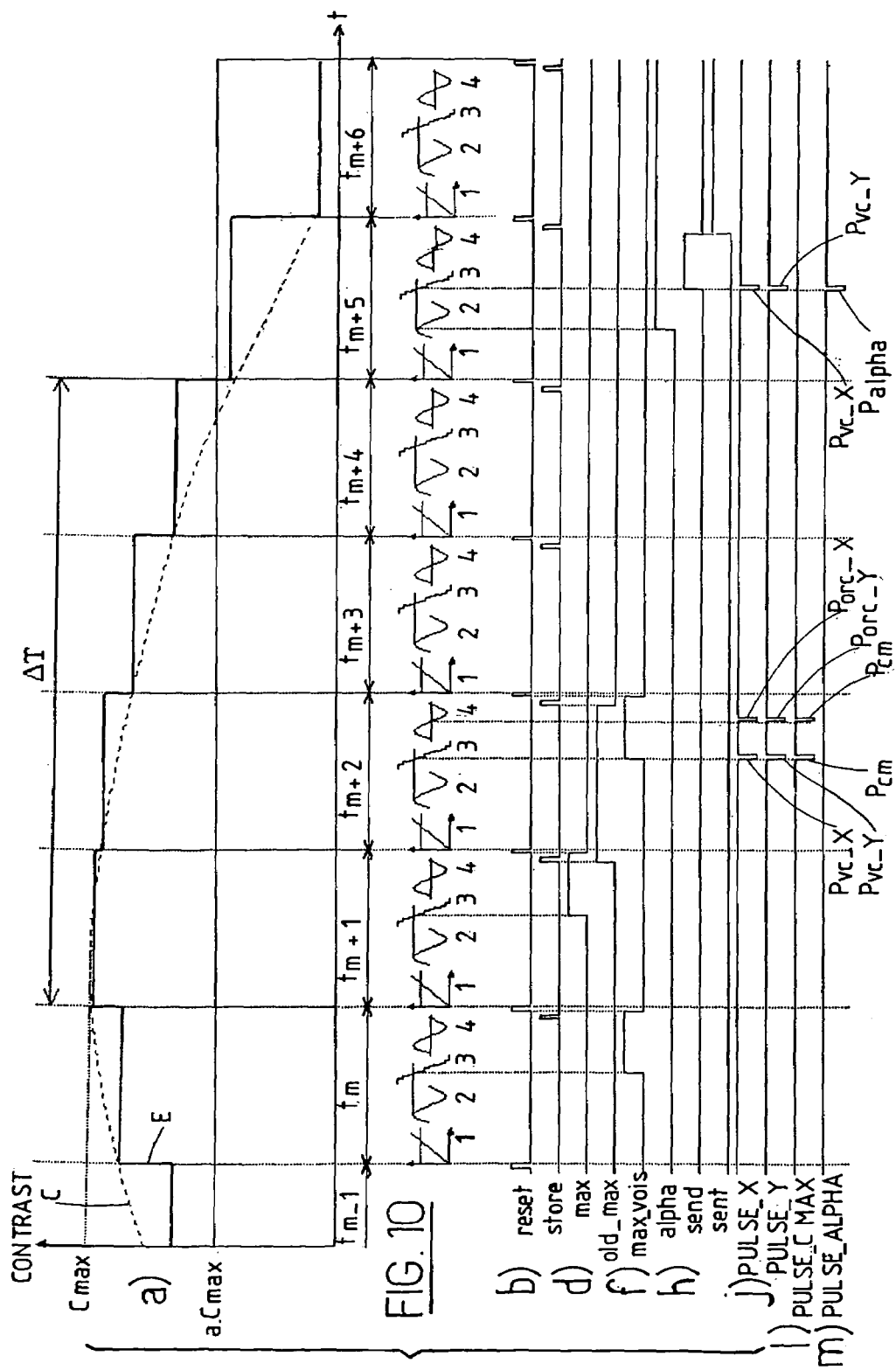

METHOD OF DETECTING RELATIVE MOVEMENT BETWEEN A SCENE FROM WHICH RADIATION EMANATES AND A MATRIX OF PIXELS ABLE TO MEASURE THE RADIATION

BACKGROUND OF THE INVENTION

1. Field of the Invention

The present invention relates to image processing. It relates more particularly to a method of detecting movement of an object and/or measuring the speed of the object relative to a matrix of pixels observing the scene within which the object is moving, the matrix being sensitive to radiation (for example light) emanating from the observed scene.

2. Description of the Prior Art

According to a known method of this kind, contrast vector information measured by a matrix of photosensors from a scene observed by the matrix is temporally encoded and the information measured by each photosensor is converted into a sinusoidal signal whose amplitude represents the magnitude of the local contrast vector and the phase represents the angle of the vector, and the detected maximum amplitude is compared to a decreasing ramp signal, a pulse being generated if the ramp signal is equal to the maximum amplitude The method further generates a second pulse if the sinusoidal function passes through zero after the first pulse is generated.

The times of occurrence of the two pulses generated in this way at each photosensor (referred to hereinafter as a pixel) constitute the time encoding of the information measured by the matrix of pixels The sinusoidal function is the result of combining the information measured by a given pixel with that measured by the adjacent pixels in the matrix, modulated by the same sinusoidal function relative to time whose phase constitutes the weighting of the adjacent pixels in the combination.

Thus the method of the prior art determines the local contrast of the observed scene for each pixel of the matrix of pixels.

An object of the invention is to propose a method that is improved over the prior art previously described, in order to determine if there is relative movement between the matrix of pixels and an object moving in the observed scene, and, where necessary, to measure the speed of that movement.

SUMMARY OF THE INVENTION

The invention provides a method of detecting relative movement between a scene from which radiation emanates and a matrix of pixels observing the scene and capable of detecting the radiation, each pixel of the matrix measuring contrast vector information representative of the observed scene, which method:

monitors the evolution of the contrast vector information in each pixel of the matrix, during a first time interval, detects among the pixels the pixel whose magnitude vector information value is greater than the magnitude vector information value of the adjacent pixels, during a second time interval consecutive to the first time interval, detects if the magnitude vector information of the pixel whose value was at a maximum during the first time interval has decreased, and generates output signals representative of the relative movement if the decrease is detected In one embodiment of the invention.

the value of the angle vector information of the pixels is measured during the first time interval, and when the greater vector information value is detected, the pixels which are adjacent the pixel whose greater value has been detected and which coincide with the vector orientation as represented by the angle value are inhibited in order to detect the relative movement in the form of a contrast edge movement.

In one embodiment of the invention the adjacent pixels are pixels in the matrix on top of, below, to the left, and to the right of the pixel concerned as a function of the contrast orientation.

One embodiment of the invention, which is further adapted to measure the speed of the relative movement:

memorizes the output signal, after the first and second time intervals, detects in the pixel whose magnitude vector information value was at a maximum during the first time interval a moment at which the value of the magnitude information reaches a predetermined fraction of the maximum value, and measures the time elapsed between the second time interval and the moment, the elapsed time being representative of the speed of the relative movement In one embodiment of the invention, as soon as the maximum value of the magnitude vector information is detected, the value is multiplied by a predetermined factor to obtain a partial value equivalent to the fraction, the partial value is stored in memory, the current value of the magnitude vector information is compared to the partial value, and a signal characteristic of the later time is generated if the current value becomes equal to the partial value.

The predetermined factor is preferably variable.

The factor is advantageously substantially equal to halt the maximum value of the magnitude vector information.

The method is preferably executed on the basis of time frames of constant or varying duration, the first and second intervals preferably each have the length of a frame, and the representative time is preferably expressed as a number of frames.

One embodiment of the invention includes.

converting vector information measured by each pixel into a sinusoidal signal whose amplitude represents the magnitude of the local contrast vector and whose phase represents the angle of the vector, comparing the detected maximum amplitude to a signal in the form of a decreasing ramp and generating a pulse when the ramp signal is equal to the maximum amplitude, and generating a second pulse when the sinusoidal function passes through a zero value after generation of the first pulse, the second pulse representing the contrast orientation, the sinusoidal function being the result of combining the information measured by a given pixel with that measured by the adjacent pixels in the matrix, modulated by the same sinusoidal modulation function with respect to time whose phase constitutes the weighting of the adjacent pixels in the combination.

Other features and advantages of the present invention will emerge in the course of the following description, which is given by way of example only and with reference to the accompanying drawings.

BRIEF DESCRIPTION OF THE DRAWINGS

FIG. 10 is a timing diagram showing how the method according to the invention is used.

DETAILED DESCRIPTION OF THE PREFERRED EMBODIMENTS

Figures 1, 2, 3:
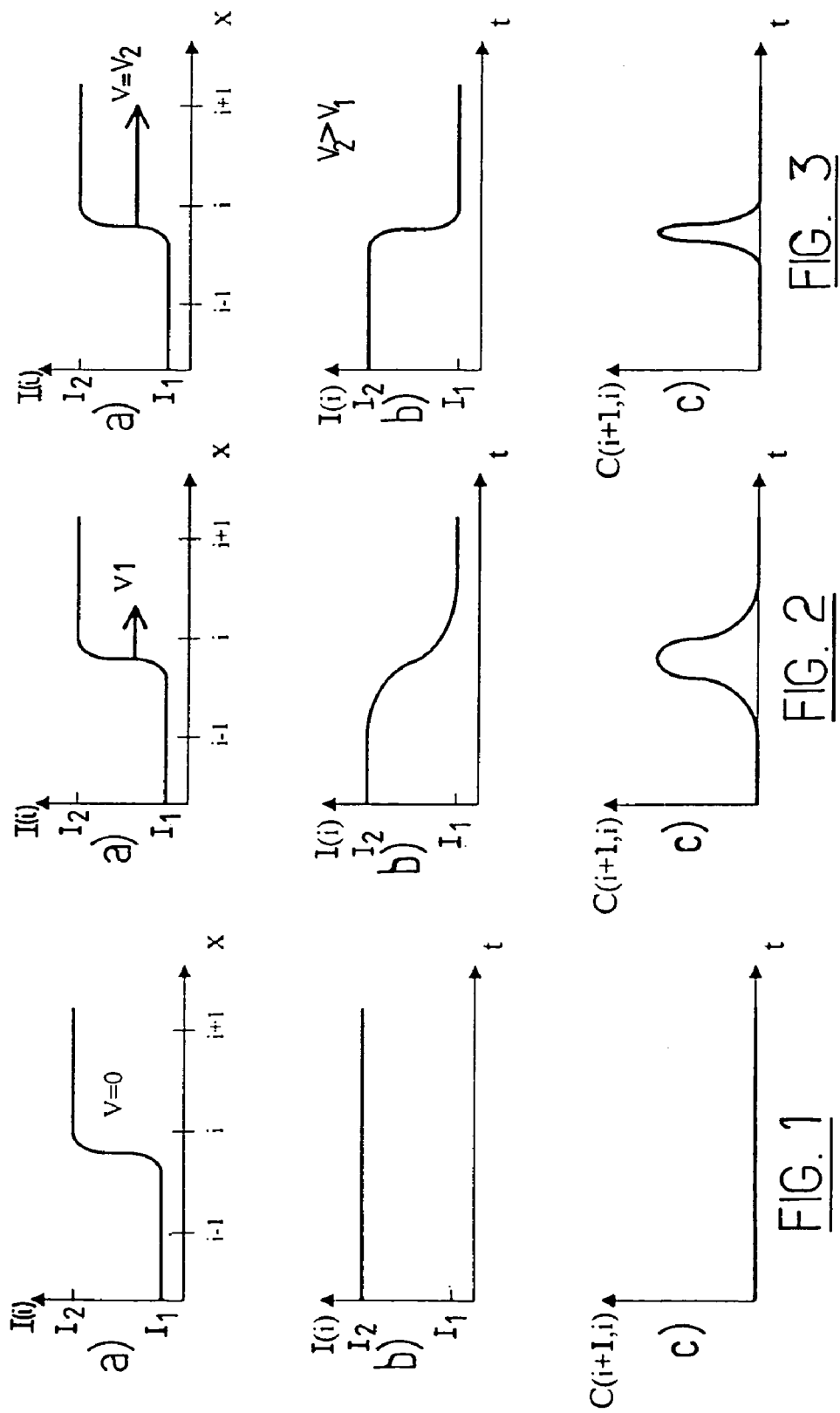
FIGS. 1, 2 and 3 are diagrams showing the basic principle of the invention.

Refer first to FIGS. 1 to 3, which show the basic principle of the method according to the invention This discussion assumes that a matrix forming an artificial retina is disposed in front of a scene and that the matrix and the scene are in relative movement. For example, the matrix might be observing a scene in which an object is moving in front of a background with which the object contrasts, or the matrix might itself be moving in front of an image including areas contrasting with other areas. In both cases, the aim is to be able to register the movement and/or to determine the speed of the movement, and the matrix of pixels can be considered as a first entity and the object or the scene as a second entity.

Note that the invention is described hereinafter in the context of an example in which the radiation emanating from the observed scene is light. The invention could nevertheless apply equally well to situations in which the radiation is of some other kind, provided that the matrix of pixels is sensitive to it, of course.

This being so, to clarify the description, FIG. 1 shows a situation in which the two entities are as yet stationary relative to each other.

It is also assumed that the luminous intensity profile due to contrast in the scene observed by the matrix varies suddenly along a line or a curve which for convenience is referred to as a "contrast edge".

FIG. 1a) shows luminous intensities $I_1$ and $I_2$ perceived by three adjacent pixels i−1, i and i+1 of the matrix, for example situated in a row of pixels along a direction i in the matrix, It can be seen that the pixels i−1 and i+1 receive the respective luminous intensities $I_1$ and $I_2$, that the pixel i also perceives the intensity $I_2$, and that in this instance the transition between the two intensities (the edge) is not perceived by any of the pixels considered.

If, as is the case in FIG. 1a), the relative speed of the two entities is zero (V=0), the intensity perceived by the pixel i is constant as a function of time t and has the value $I_2$ (FIG. 1b)). The contrast C between the pixels i and i+1 as a function of time t remains equal to zero (FIG. 1c)).

In FIG. 2, the relative speed V has a given value $V_1$. The contrast edge is therefore propagating relative to the matrix, as is clear from FIG. 2a) When the edge passes in front of the pixel i (FIG. 2b)), the luminous intensity changes from $I_2$ to $I_1$. The contrast C between the pixels i and i+1 (more generally between two adjacent pixels perceiving the movement of the contrast edge) increases from zero to a maximum and then falls to zero again (FIG. 2c)).

In FIG. 3, it is assumed that the relative speed V=$V_2$, the value $V_2$ being chosen to be greater than the speed $V_1$ (FIG. 3a)). Under these conditions, the edge passes more quickly in front of the pixel i which therefore perceives a steeper luminous intensity transition (FIG. 3b)). The contrast C then has a variation curve whose shape is analogous to that of FIG. 2, but narrower (FIG. 3c)). Conversely, if the relative speed were lower, the contrast evolution curve would be more spread out compared to the shape shown in FIG. 2c).

It can therefore be seen that there is a given relationship between the evolution of the contrast C and the speed of propagation of the contrast edge; in other words, it is possible to deduce from the evolution with respect to time of the contrast C information on the relative movement between the scene observed by the matrix of pixels and the matrix itself, and possibly on the speed of that movement.

These observations having been made, it has been found that the function representative of this contrast variation of a moving contour (edge) resembles a propagating wave whose time to change from its peak value to a fraction thereof is, to a first approximation, inversely proportional to the speed of the contour in the direction of the spatial gradient corresponding to the contour.

Figure 4:
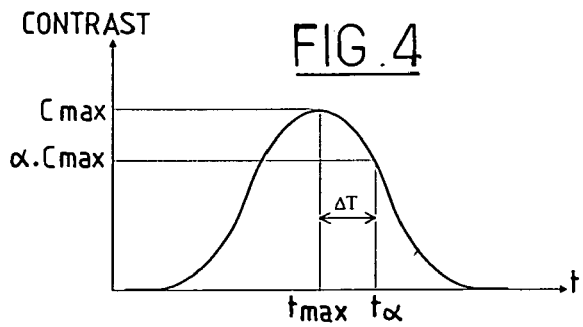
FIG. 4 shows how the method according to the invention measures the relative speed of an object and a matrix of pixels.

Thus, according to the invention (FIG. 4), to detect movement between the two entities, it is important to know if the contrast curve passes through a maximum ($C_{max}$) in a pixel over which the contrast edge is passing. If it is also required to determine the speed of this movement, the time $\Delta T$ between the time $t_{max}$ at which the contrast curve is at its maximum $C_{max}$ and the time $t_\alpha$ at which the function reaches a fraction $\alpha$ of that maximum ($\alpha.C_{max}$) with $0<\alpha<1$, is measured. In other words, it is a question of measuring the time Interval $\Delta T = t_\alpha - t_{max}$ between the time at which the contrast reaches the value $C_{max}$ and the time at which it reaches the value $\alpha.C_{max}$.

Figure 5:
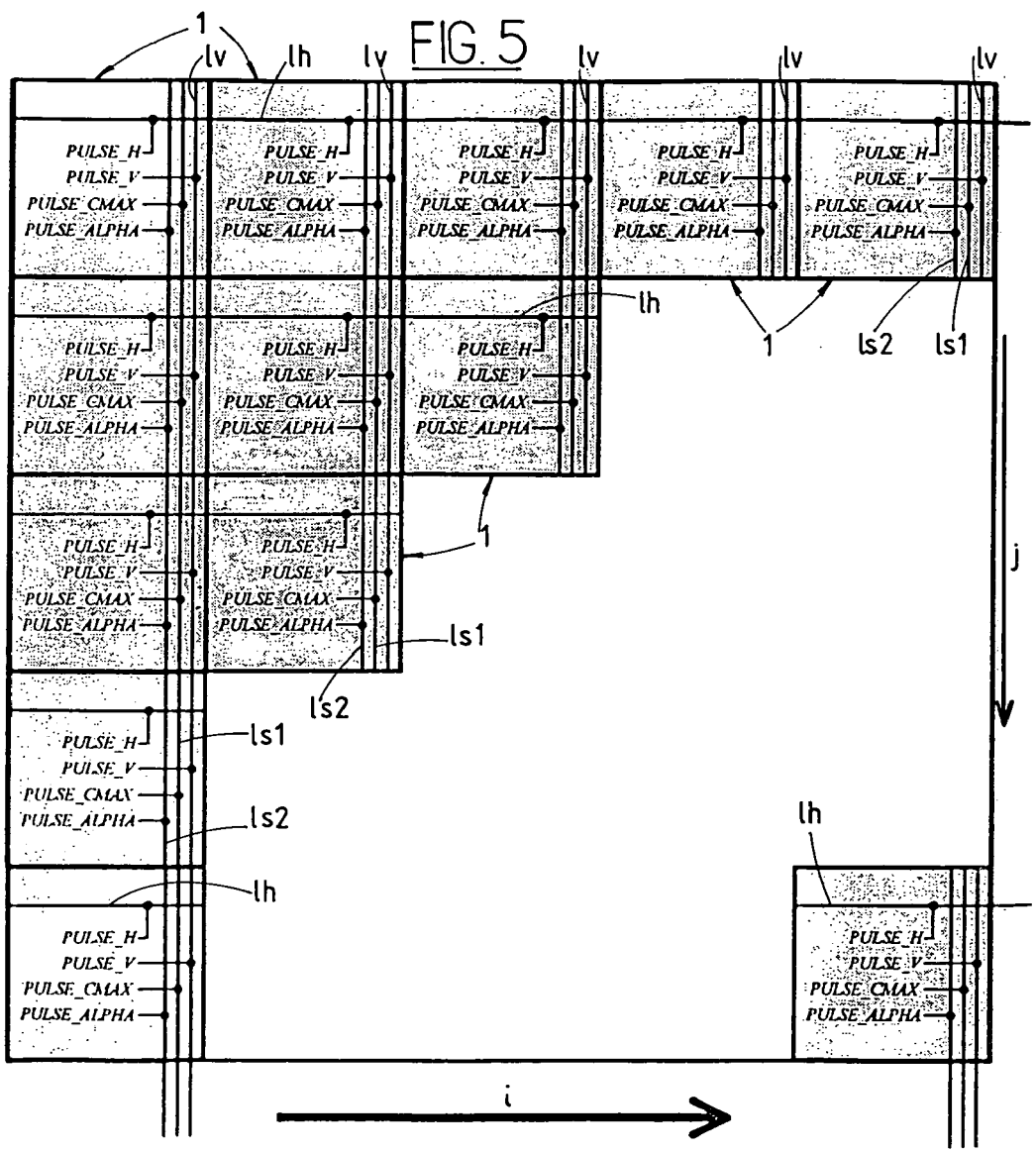
FIG. 5 is a diagrammatic representation of a matrix of pixels for implementing a method according to the invention.

FIG. 5 is a very simplified diagram of a matrix 1 of pixels for implementing the concepts that have just been described To simplify the drawing, the diagram shows only a few pixels. However, persons skilled in the art will realize that the matrix can include any number of pixels, for example 64×64 or more.

The pixels are arranged in rows along the axis i (also referred to as the horizontal axis) and in columns along the axis i (also referred to as the vertical axis). Each pixel is connected to horizontal and vertical addressing rows Ih and Iv, respectively, and their output signals PULSE_CMAX and PULSE_ALPHA appear on respective vertical output rows Is1 and Is2 in each column of the matrix 1. All the pixels of the matrix have an identical structure, which is described hereinafter with reference to FIGS. 6 to 10.

Figure 6:
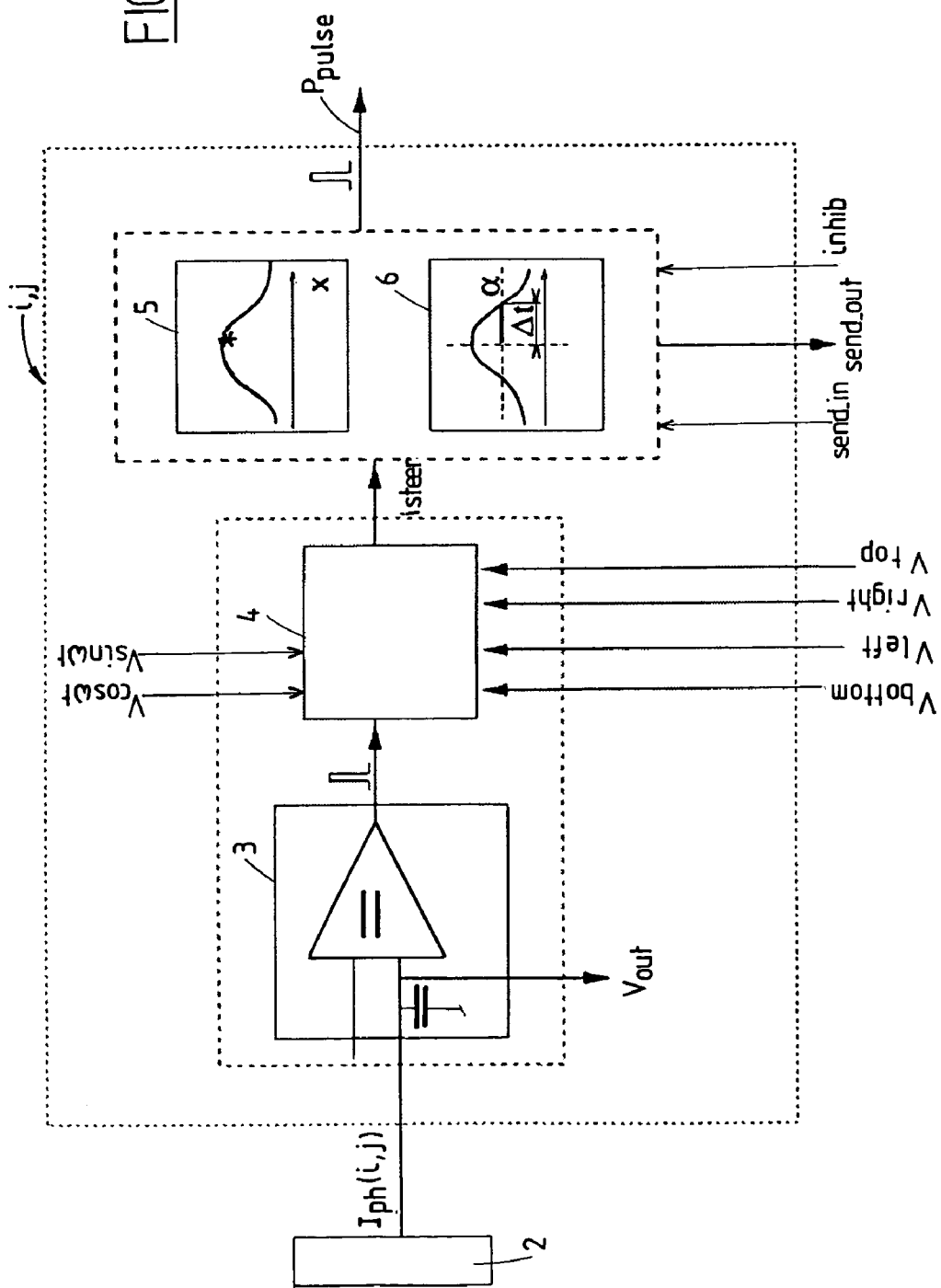
FIG. 6 is a block diagram of one pixel from the FIG. 5 matrix.

FIG. 6 is a block diagram for each pixel of the matrix 1 shown in FIG. 5, for example the pixel with coordinates i.j. It includes a unit 2 for acquiring a luminance signal $I_{ph}(i,j)$, an integrator 3, a circulating filter 4, a maximum detection control unit 5, and a unit 6 for determining the speed, i.e. the value $\Delta T$. The wanted signals representative of wanted parameters (contrast, contrast orientation, and speed of movement) appear selectively and offset in time in the form of a signal $p_{pulse}$ at the output of the units 5 and 6.

Figure 7:
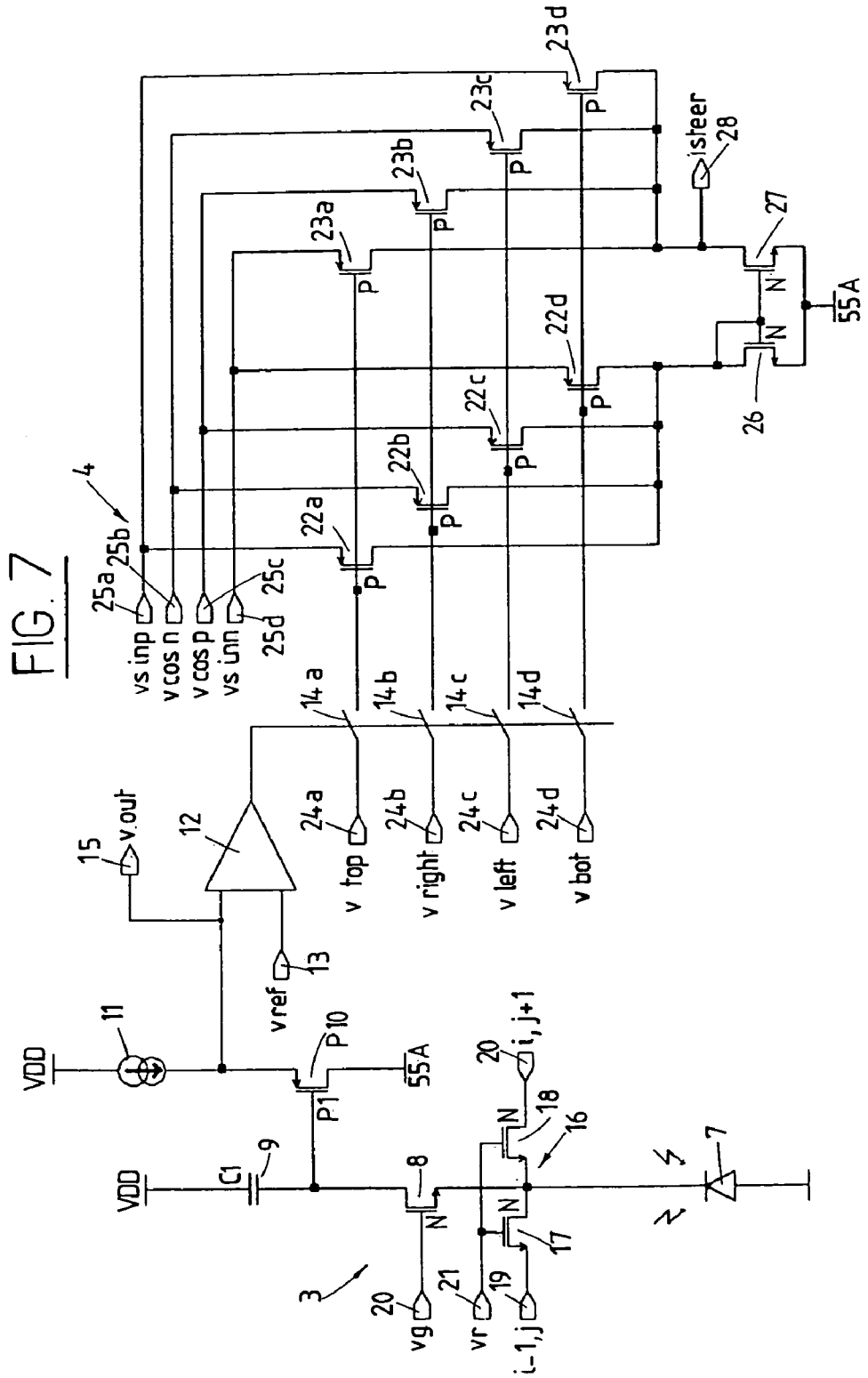
FIG. 7 is a more detailed diagram of a first portion of the pixel

FIG. 7 shows in detail the units 2, 3 and 4 from FIG. 6. A photodiode 7 is connected in series with an N transistor 8 and a capacitor 9 between the supply voltages $V_{DD}$ and $V_{SS}$. The capacitor 9 is part of the integrator 3. It is connected to the gate of a P transistor 10 which is connected in series with a current source 11 between the voltages $V_{DD}$ and $V_{SS}$. The node between the P transistor 10 and the current source 11 forms one of the inputs of a comparator 12 whose other input receives a reference voltage $v_{ref}$ from a terminal 13 The output of the comparator 12 controls four switches 14a to 14d of the unit 4 forming a circulating filter. The node between the current source 11 and the P transistor 10 also forms an output 15 of the integrator 3 and supplies a voltage $v_{out}$ which is the result of integrating the luminance signal.

The node between the photodiode 7 and the N transistor 8 is connected to a diffusion network 16 which distributes the photocurrent $I_{ph}(i,j)$ to four adjacent pixels Thus this node is connected by an N transistor 17 to the analogous node of the pixel with coordinates (i−1, j) and by an N transistor 18 to the analogous node of the pixel with coordinates (i, j+1) via terminals 19 and 20 The diffusion network 16 provides low-pass filtering of the luminance signals by diffusion of luminous currents into a plurality of pixels adjoining the pixel i,j concerned in the matrix. The degree of diffusion can be adjusted by voltages $v_g$ and $v_r$ respectively applied to the gates of the transistor 8 and the transistors 17 and 18 from terminals 20 and 21.

The circulating filter 4 includes two groups each of four P transistors 22a to 22d and 23a to 23d whose gates are connected to the respective switches 14a to 14d. When they are closed, these switches apply to these gates respective voltages $v_{top}$, $v_{right}$, $v_{left}$ and $v_{bot}$ from terminals 24a to 24d which are respectively connected to the terminals 15 of the pixels adjoining the pixel concerned; in other words, these terminals receive the voltages $v_{out}$ of the pixels that are on too of to the right of, to the left of and below the pixel i,j concerned In each group of transistors 22a to 22d and 23a to 23d, the drain-source paths are connected to respective input terminals 25a to 25d to which sinusoidal signals $v_{sinp}$, $v_{cosn}$, $v_{cosp}$, and $v_{sinn}$ formed from four sinusoidal signals with a relative phase shift of 90° are formed.

The source drain paths of the transistors of the groups 22a to 22d and 23a to 23d are connected in common to respective output transistors 26 and 27, the node between the transistors 22a to 22d and the transistor 26 constituting an output terminal 28 on which appears a current $i_{steer}$ which is sinusoidal and whose amplitude and phase respectively encode the contrast normal and orientation.

Figure 8:
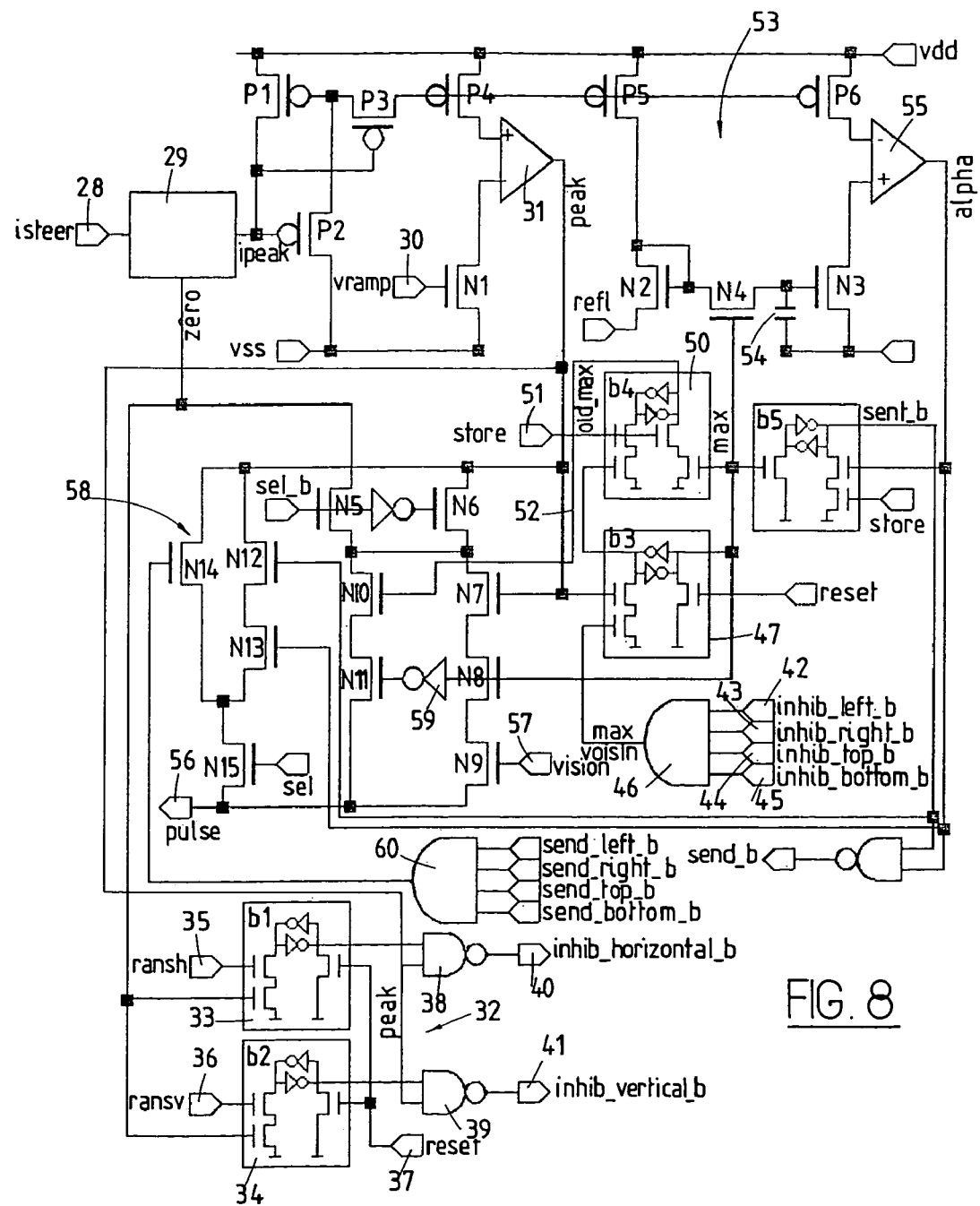
FIG. 8 shows another portion of the pixel

FIG. 8 is a more detailed diagram of the units 5 and 6 from FIG. 6.

Before examining FIG. 8, it is beneficial to note that the method according to the invention is executed subject to timing by successive frames with the aid of a clock (not shown) which delivers the appropriate clock signals to the units concerned with the pixels of the matrix 1. For example, to give a more concrete idea of this, the frequency of these frames can be from 30 Hz to 200 Hz. Each frame is preferably divided into four time slats during which the following four phases of operation are respectively executed (see also FIG. 10):

Phase 1: acquisition by integrating the luminance signal in each pixel

Phase 2: calculating the local contrast value in each pixel and storing the maximum local contrast value in memory.

Phase 3: comparing the contrast value with a descending ramp voltage and encoding the contrast normal.

Phase 4: calculating the local contrast orientations.

Note that during each phase of each frame, some circuits must be activated while others are deactivated This activation and deactivation are controlled by signals derived from the system clock. To simplify the drawings, the components needed for this and their connections to other portions of the matrix are not shown FIG. 8 shows that the signal $i_{steer}$ appearing at the terminal 28 in FIG. 7 is applied to a processor unit 29 in which the signal $i_{steer}$ is rectified to form a half-wave current $i_{peak}$ (here formed by the negative half-cycles) and in which pulses $p_{zero}$ are generated each time that the signal $i_{steer}$ crosses zero in a given direction.

The current $i_{peak}$ is processed in a memory circuit comprising four P transistors P1 to P4 connected so that the minimal value of the negative half-cycles of the current $i_{peak}$ (i.e. its maximum value) is locked at the gate of the transistor P4 during the current frame. This value is copied to two other P transistors P5 and P6.

A signal $v_{ramp}$ in the form of a descending ramp is applied from a terminal 30 to the gate of an N transistor N1 whose source-drain path is connected to a first input of a comparator 31, whose other input is connected to the source-drain path of the transistor P4 so that the comparator 31 delivers a pulse $p_{peak}$ when the current flowing in the transistor P4 is equal to that flowing in the transistor N1.

Figure 9A:
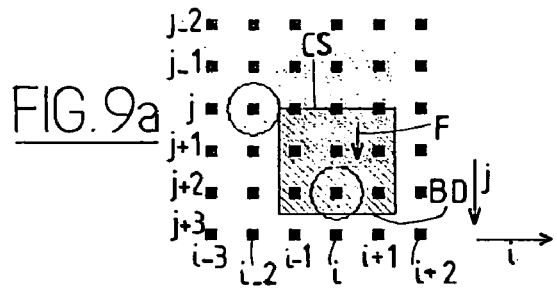
FIGS. 9a, 9b and 9c are diagrams showing how the method according to the invention is used.

FIG. 9a shows a group of pixels of the matrix 1, comprising a pixel i,j and a few adjacent pixels. For the purposes of the description, it is assumed that at a given time the matrix 1 "sees" in the observed scene an object creating thereon a dark square CS covering nine pixels and forming contrast edges, the square CS being surrounded by a white area. It is also assumed that, because of the relative movement between the observed scene and the matrix 1, the dark square CS is apparently moving in the direction of the arrow F. Under these conditions, the contrast edge BD (the "bottom" edge of the square CS) has just passed the pixel i,j The time considered can then correspond to the frame $t_{m+2}$ shown in FIG. 10, as will become apparent in the remainder of the description, it further being assumed that FIG. 10 reflects events occurring in the pixel i,j.

Figure 9B:
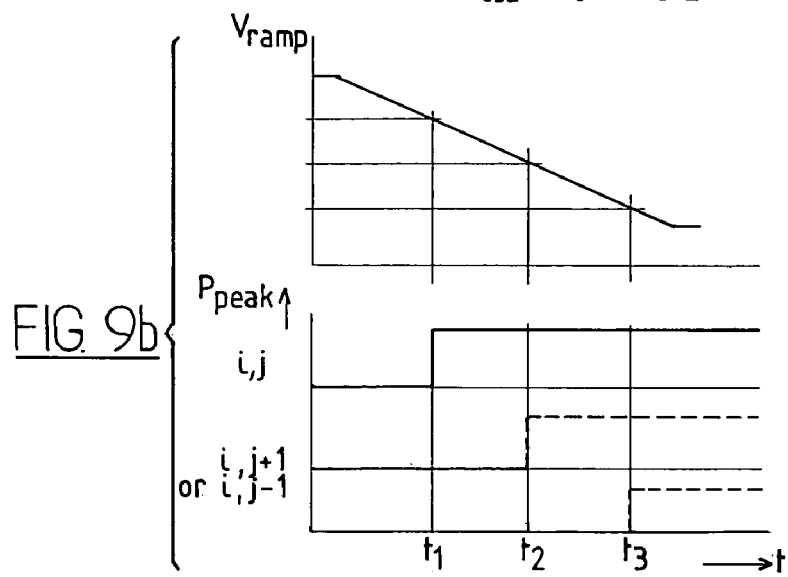

With regard to the situation shown in FIG. 9a, FIG. 9b shows the waveform of the voltage $V_{ramp}$ and the signal $p_{peak}$ at the output of the comparator 31 from FIG. 9 in the pixel i,j and its adjacent pixels i,j−1 and i,j+1 during frame $t_{m+1}$ (FIG. 10) during which the contrast in the pixel i,j is at a maximum It can be seen that the comparator 31 of the pixel i,j changes state first (at time $t_1$) during the descent of the ramp. On the other hand, the comparators 31 of the adjacent pixels along the j axis change state at later times, for example at time $t_2$. Because of the shape of the square CS, in the example described, the pixels adjacent the pixel i,j in the direction i react in the same manner as the pixel i,j.

However, according to an important aspect of the invention, the contrast information is retained only if, during a given frame, a maximum of the current $i_{steer}$ of a pixel is detected before the pixels adjacent the pixel concerned i,j in the direction of the contrast measured by the pixel i,j detect the maximum of their own current $i_{steer}$. As soon as the maximum is detected in the pixel that gains primacy over its neighbors, that pixel sends an inhibiting signal to those neighbors, which immediately become inoperative for the remainder of the current frame. For example, in the FIG. 9a example, in which it is assumed that the pixel i,j detects its maximum first, the contrast information for the adjacent pixels i,j+1 and i, j−1 will not be retained, because they are in the direction of the contrast, whereas the contrast information for pixels i−1,j and i+1,j must be processed After the orientation of its contrast (in more concrete terms, that of the edge BD) has been determined, each pixel can produce inhibiting signals applied to certain adjacent pixels whose information must be set aside.

FIG. 8 shows that the pulse $p_{peak}$ is sent to an inhibiting section 32 which also receives a pulse signal $p_{zero}$ from the processor unit 29 representative of the orientation of the contrast (the phase of the current $i_{steer}$). The inhibiting section includes two latches 33 and 34 to which this signal is applied to be combined logically with signals $p_{nmsh}$ and $p_{nmsv}$, respectively, whose period corresponds to that of the sinusoidal signals applied to the inputs 25a to 25d of the circulating filter 4 and which are applied to the terminals 35 and 36. The latches 33 and 34 are reset to the initial state at the end of each frame by a signal $p_{reset}$ applied to a terminal 37. The signal $p_{reset}$ is derived from the system clock. The outputs of the latches 33 and 34 are logically combined with the pulses $p_{peak}$ in respective NAND gates 38 and 39, at the outputs 40 and 41 of which appear the respective inhibiting signals $p_{inhib\_horizontal\_b}$ and $p_{inhib\_vertical\_b}$.

Figure 9C:
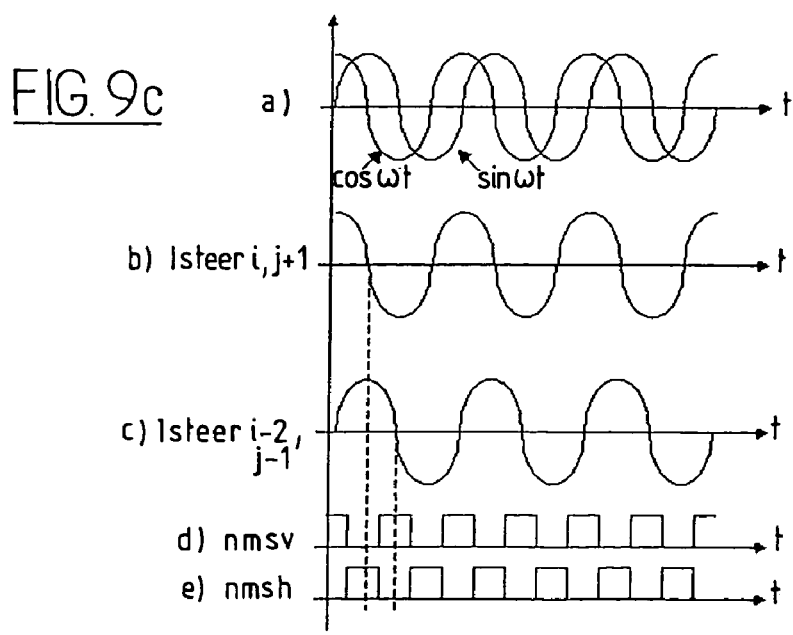

FIG. 9c shows how the inhibiting section 32 combines the zero crossings of the current $i_{steer}$ with the signals $p_{nmsh}$ and $p_{nmsv}$ in order to determine the vertical and horizontal inhibiting signals to be applied to certain adjacent pixels. In this figure, the curve a) represents the sinusoidal and cosinusoidal signals applied to the filter 4 from FIG. 7 (inputs 25a to 25d) In FIG. 9c the curve b) represents, for the FIG. 9a example, the waveform of the current $i_{steer}$ of the pixel i–2,j–1 and the curve c) shows that of the current $i_{steer}$ of the pixel i,j+1.

Returning to the pixel i,j of the example described, this generates the vertical inhibiting signal $p_{inhib\_vertical\_b}$ during the frame $t_{m+1}$ concerned and sends it to its vertically adjacent pixels, i.e to the pixels i,j–1 and i,j+1, to prevent them from operating during the current frame. How the pixels can inhibit their neighbors in this way is described below.

To be able to determine the value and orientation of the contrast $C_{max}$, it is not only necessary for the pixel in question, for example the pixel i,j, to produce the signal $p_{peak}$ first during the frame concerned, but also for the contrast to pass through a maximum According to another important aspect of the invention, the contrast and contrast orientation are validated for a given pixel only if, after detection of the primacy of the contrast value for that pixel relative to its neighbors, it is also established, during the next frame, if it is a question of a reduction in the contrast, The FIG. 10 curves explain this aspect of the invention. The diagram a) in FIG. 10 shows the evolution of the contrast value of the pixel i,j in the context of the FIG. 9a example (dashed line curve C). The staircase curve E in the same diagram symbolizes the value stored in memory during each frame of the detected maximum value of the current $i_{peak}$ produced at the output of the processor unit 29. The other curves b) to m) in FIG. 10 represent signals that appear at various points of the circuit represented in FIG. 8, which should be referred to again.

The inhibiting signals that can be applied to the pixel concerned enter it via the terminals 42 to 45, to which are respectively applied the signals $p_{inhib\_left\_b}$, $p_{inhib\_right\_b}$, $p_{inhib\_top\_b}$ and $p_{inhib\_bottom\_b}$ coming from the pixels to the left, to the right, on top of and under the pixel concerned. These signals are applied to an OR gate 46 whose output produces the signal $p_{max\_vols}$ which will therefore be active if none of the input signals of the gate 46 is active (note that the suffix "b" indicates a complemented signal). The input signals of the OR gate 46 come from the respective terminals 40 or 41 of the adjacent pixels.

The signal $p_{peak}$ and the signal $p_{max\_vols}$ (see curves b) to m) in FIG. 10) are applied to a latch 47. Consequently, if the two signals are active during a frame, the pulse $p_{peak}$ is stored in the latch until the end of the frame, i.e. for as long as the signal $p_{reset}$ is not applied to the terminal 48 of the latch 47. In other words, during a given frame, if a given pixel IS not inhibited by one of its neighbors, it is because it has primacy over it and its signal $p_{peak}$ is produced first during the current frame (FIG. 9b). Under these conditions, only the pulse $p_{peak}$ is stored, appearing at a node 49 of the latch 47 in the form of a signal $p_{max}$.

Accordingly, in the FIG. 10 example, during the frame $t_m$, the signal $p_{max\_vols}$ prohibits the passage of the signal $p_{peak}$ of the pixel i,j concerned toward the node 49 at the output of the latch 47 On the other hand, in the next frame $t_{m+1}$ the signal $p_{max\_vols}$ is inactive. Consequently, the pixel i,j has primacy so that the signal $p_{max}$ passes through the latch 47 of this pixel (curves d) and f)).

The signal $p_{max}$ is applied to another latch 50 which can pass the pulse to its output only if a signal $p_{store}$ is applied to it via a terminal 51. The signal $p_{store}$ produces a pulse lust before the end of each frame and is derived from the system clock.

Consequently, when the signals $p_{max}$ and $p_{store}$ are active, the latch 50 produces a signal at the output $p_{old\_max}$ representing the fact that the pixel has reached a maximum during the frame preceding the current frame. In the example, this is the case during the frame $t_{m+2}$ for the pixel i,j whose contrast value was at a maximum during the frame $t_{m+1}$.

In a comparison section 53, the signal $p_{max}$ is also applied to the gate of an N transistor N4 whose source-drain path is connected between the gates of two N transistors N2 and N3 The transistor N2 is connected in series with the transistor P5 so that a current $i_{peak}$ flows through it. The transistors N2 and N3 form a current mirror and it is therefore possible to adjust the output current of the transistor N3 to a fraction $\alpha$ of the maximum value of the current $i_{peak}$ coming from the processor 29 and retained by the transistor P4. In a preferred embodiment, $\alpha$ is substantially equal to 0.5. A capacitor 54 is charged to a voltage that depends on the current flowing in the transistors P5 and N2 when the transistor N4 is turned on by the signal $p_{max}$. The source drain path of the transistor P6 is connected to the inverting input of a comparator 55 whose non-inverting input is connected to the source-drain path of the transistor N3. The comparator 55 changes state as soon as the maximum value of the current $i_{peak}$ falls below the value of the current flowing in the transistor N3. This comparator then supplies a signal $p_{alpha}$.

The value 0 5 of the factor $\alpha$ can be determined by the parameter values for the transistors N2 and N3 of the comparison section 53 without there being any adjustment facility. Nevertheless, in the embodiment shown in the figures, the sources of the transistors N2 and N3 are connected, not to the supply voltage $V_{SS}$, but to variable reference voltage sources, and the factor $\alpha$ can therefore be chosen as required The output of the FIG. 8 circuit is the terminal 56 at which can selectively appear all of the pulses useful for determining the local contrast value and orientation for the pixel concerned (pixel i,j), from which it is possible to determine the existence of relative movement and the speed of propagation of the contrast edge (i e. the speed of that movement). Note that the pulses are presented at both edges of the matrix 1 at the same time in order to be able to localize the pixel from which the pulses come by means of the address that they thereby supply.

Furthermore, the matrix can operate at will either in a "vision" mode in which static contrast information is detected or in a "speed" mode in which the speed of relative displacement of the observed scene and the matrix 1 can be evaluated. Mode selection is effected by means of a control signal $p_{vision}$ applied to a terminal 57, the vision mode being selected when the signal $p_{vision}$ is active and the speed mode being selected otherwise. Another control signal $p_{set}$ derived from the system clock controls the passage to the output terminal 56 of the contrast or orientation pulses.

In order to be able to apply the appropriate output pulses ($p_{pulse}$) to the terminal 56 at the appropriate times, the FIG. 8 circuit includes a selection section 58 to which the pertinent pulses are applied together with the control signals just referred to Note further that the signals representing the contrast magnitude and orientation can be extracted from the pixel that has inhibited its neighbors only if it has actually passed through a maximum. According to the invention, said signals are produced at the terminal 56, not during the frame during which the maximum occurs, but during the next frame, i.e. during the frame in which the local contrast is found to decrease, which phenomenon is reflected in the loss of primacy for the pixel for which the maximum has previously occurred. This is why the signal $p_{max}$ reflecting the passage through the maximum is stored in the latch 50 during the current frame to generate the signal $p_{old\_max}$ which goes to the active state only during the next frame. To be certain that the maximum has just passed, the signals $p_{max}$ and $p_{old\_max}$ are combined logically, and authorization for presentation of the signals at the output terminal 56 is given only if the signal $p_{max}$ is inactive and the signal $p_{old\_max}$ is active. This logical combination is obtained by means of the transistors N10 and N11 of the selection section 58 and an inverter 59.

Vision/speed mode selection is effected by a branch of the selection section 58 comprising the N transistors N6 to N9.

Accordingly, in the FIG. 10 example, the pixel i,j passes through a maximum during the frame $t_{m+1}$ and therefore delivers the pertinent pulses during the next frame $t_{m+2}$ and in the directions i and j of the matrix 1. Accordingly, the curves j), k) and l) in FIG. 10 show that two groups of three pulses are successively delivered during the frame $t_{m+2}$, namely two contrast value pulses $p_{vc\_X}$ and $p_{vc\_Y}$ and a maximum pulse $p_{cm}$, on the one hand, and two orientation pulses $p_{or\_X}$ and $p_{or\_Y}$ and a maximum pulse $p_{cm}$, on the other hand.

When the signal $p_{alpha}$ goes to the high state and the signal sent_b is in the high state, the terminal send_b goes to the low state, which forces the adjacent pixels to send their contrast value during this frame. When the signal send_b goes to the low state, the output of the gate 60 of the adjacent pixels goes to the high state. The output of the gate 60 is applied to an N transistor N14 of a third branch of the selection section of the FIG. 8 circuit. The transistor N14 can short circuit two other N transistors N12 and N13 connected in series with an N transistor N15 to which the signal $p_{set}$ is applied.

In order to improve the accuracy of the speed estimate (see below), the contrast information for the pixels adjacent the pixel i,j is sent when the contrast in the pixel i,j reaches the fraction α of its maximum.

The time that elapses between the contrast passing through a maximum and a fraction α of the maximum is approximately inversely proportional to the speed of the contrast edge in the direction of the spatial contrast gradient corresponding to that edge. In reality, this time depends on the slope of the contrast function between the points $C_{max}$ and $\alpha.C_{max}$ (see FIG. 4). When the slope increases, the time decreases, and vice-versa. The new value ΔT' is much less dependent on the slope of the contrast function and the speed determined on this basis is therefore more accurate by multiplying ΔT by $C_{max}$ and dividing the product by the contrast gradient measured when the contrast curve passes through the value $\alpha.C_{max}$.

While the contrast curve is falling, the pixel i,j waits for the comparator 55 to change state so that the interval ΔT can be measured. The change of state of the comparator 55 generates the signal $p_{alpha}$ which is conveyed via the terminal 56 to the rows Is2 of the matrix 1. At the same time, contrast value signals $p_{vr\_x}$ and $p_{vc\_y}$ are sent, the signal $p_{peak}$ being applied to the third branch of the selection section 58.

The interval ΔT can be deduced from the number of frames since the occurrence of the pertinent pulses associated with the maximum up to the occurrence of the pulses relating to the signal $p_{alpha}$, plus one frame Although the preceding description refers to frames of constant duration, it is to be understood that the frames can be of varying duration, depending on the intended application, for example to adapt the dynamics of the system.

There is claimed:

1. A method of detecting relative movement between a scene from which radiation emanates and a matrix of pixels observing said scene and capable of detecting said radiation, each pixel of said matrix measuring contrast vector information representative of the observed scene, which method:
   monitors the evolution of said contrast vector information in each pixel of said matrix,
   during a first time interval, detects among said pixels the pixel whose magnitude vector information value is greater than the magnitude vector information value of the adjacent pixels,
   during a second time interval consecutive to the first time interval, detects if the magnitude vector information of the pixel whose value was at a maximum during the first time interval has decreased, and
   generates output signals representative of said relative movement if said decrease is detected.

2. The method claimed in claim 1 wherein:
   the value of the angle vector information of said pixels is measured during said first time interval, and
   when said greater vector information value is detected, the pixels which are adjacent the pixel whose greater value has been detected and which coincide with the vector orientation as represented by said angle value are inhibited in order to detect said relative movement in the form of a contrast edge movement.

3. The method claimed in claim 1 wherein said adjacent pixels are pixels in said matrix on top of, below, to the left, and to the right of the pixel concerned as a function of the contrast orientation.

4. The method claimed in claim 1, further adapted to measure the speed of said relative movement, and which:
   memorizes said output signal,
   after said first and second time intervals, detects in the pixel whose magnitude vector information value was at a maximum during said first time interval a moment at which the value of said magnitude information reaches a predetermined traction of said maximum value, and
   measures the time elapsed between said second time interval and said moment, said elapsed time being representative of the speed of said relative movement.

5. The method claimed in claim 4 wherein, as soon as said maximum value of said magnitude vector information is detected, said value is multiplied by a predetermined factor to obtain a partial value equivalent to said fraction, said partial value is stored in memory, the current value of said magnitude vector information is compared to said partial value, and a signal characteristic of said later time is generated if said current value becomes equal to said partial value.

6. The method claimed in claim 5 wherein said predetermined factor is variable.

7. The method claimed in claim 5 wherein said factor is substantially equal to half the maximum value of said magnitude vector information.

8. The method claimed in claim 5 when executed on the basis of time frames of constant or varying duration, said first and second intervals each have the length of a frame, and said representative time is expressed as a number of frames.

9. The method claimed in claim 1 including:
- converting vector information measured by each pixel into a sinusoidal signal whose amplitude represents the magnitude of the local contrast vector and whose phase represents the angle of said vector,
- comparing the detected maximum amplitude to a signal in the form of a decreasing ramp and generating a pulse when said ramp signal is equal to said maximum amplitude, and
- generating a second pulse when said sinusoidal function passes through a zero value after generation of the first pulse, said second pulse representing the contrast orientation,
- said sinusoidal function being the result of combining the information measured by a given pixel with that measured by the adjacent pixels in said matrix, modulated by the same sinusoidal modulation function with respect to time whose phase constitutes the weighting of said adjacent pixels in the combination.

* * * * *